(12) United States Patent  (10) Patent No.: US 9,955,293 B2
Colby et al.  (45) Date of Patent: Apr. 24, 2018

(54) SYSTEMS AND METHODS FOR DEVICE PROVISIONING

(71) Applicant: Intel Corporation, Santa Clara, CA (US)

(72) Inventors: Robert A. Colby, Granite Bay, CA (US); David J. McCall, Dallas, TX (US); Mats Agerstam, Portland, OR (US); Xintian E. Lin, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 338 days.

(21) Appl. No.: 14/614,162

(22) Filed: Feb. 4, 2015

(65) Prior Publication Data

US 2016/0227397 A1    Aug. 4, 2016

(51) Int. Cl.
 *H04W 4/02*  (2009.01)
 *G01S 15/00*  (2006.01)
 *H04W 8/00*  (2009.01)

(52) U.S. Cl.
 CPC .............. *H04W 4/02* (2013.01); *G01S 15/00* (2013.01); *H04W 8/005* (2013.01)

(58) Field of Classification Search
 CPC . H05B 37/0275; H05B 37/0245; H05B 37/02
 See application file for complete search history.

(56) References Cited

U.S. PATENT DOCUMENTS

| 2003/0184475 A1* | 10/2003 | Williams | G01S 5/02 342/465 |
| 2004/0203363 A1* | 10/2004 | Carlton | G06Q 30/02 455/41.2 |
| 2010/0141153 A1* | 6/2010 | Recker | H05B 33/0803 315/149 |

* cited by examiner

Primary Examiner — Hovhannes Baghdasaryan
(74) Attorney, Agent, or Firm — Eversheds Sutherland (US) LLP

(57) ABSTRACT

The present disclosure relates to computer-implemented systems and methods for device provisioning. The method may include receiving, by a computer, a selection instructions to detect wireless devices. The computer may include one or more processors, a radio transceiver, and a microphone. The method may also include identifying, by the radio transceiver, a plurality of wireless devices. Additionally, the method may include transmitting, by the radio transceiver to the wireless devices, respective requests for inaudible audio signal transmission. The method may also include receiving, by the microphone, a first inaudible audio signal from a first wireless device of the plurality of wireless devices. Further still, the method may include determining, based at least in part on the first inaudible audio signal, that the first wireless device is located in the same room as the user device.

24 Claims, 3 Drawing Sheets

SYSTEMS AND METHODS FOR DEVICE PROVISIONING

TECHNICAL FIELD

The present disclosure generally relates to wireless communication, and in particular, device provisioning.

BACKGROUND

Device provisioning may typically involve downloading, installing, and/or otherwise accessing applications, settings, preferences, and/or other information associated with a user. In certain cases, device provisioning may typically involve interaction from the user, which may decrease efficiency and degrade user experience. Thus, facilitating the device provisioning process while limiting the amount of user interaction may prove beneficial.

BRIEF DESCRIPTION OF THE DRAWINGS

Reference will now be made to the accompanying figures and diagrams, which are not necessarily drawn to scale, and wherein.

DETAILED DESCRIPTION

Figure 1:
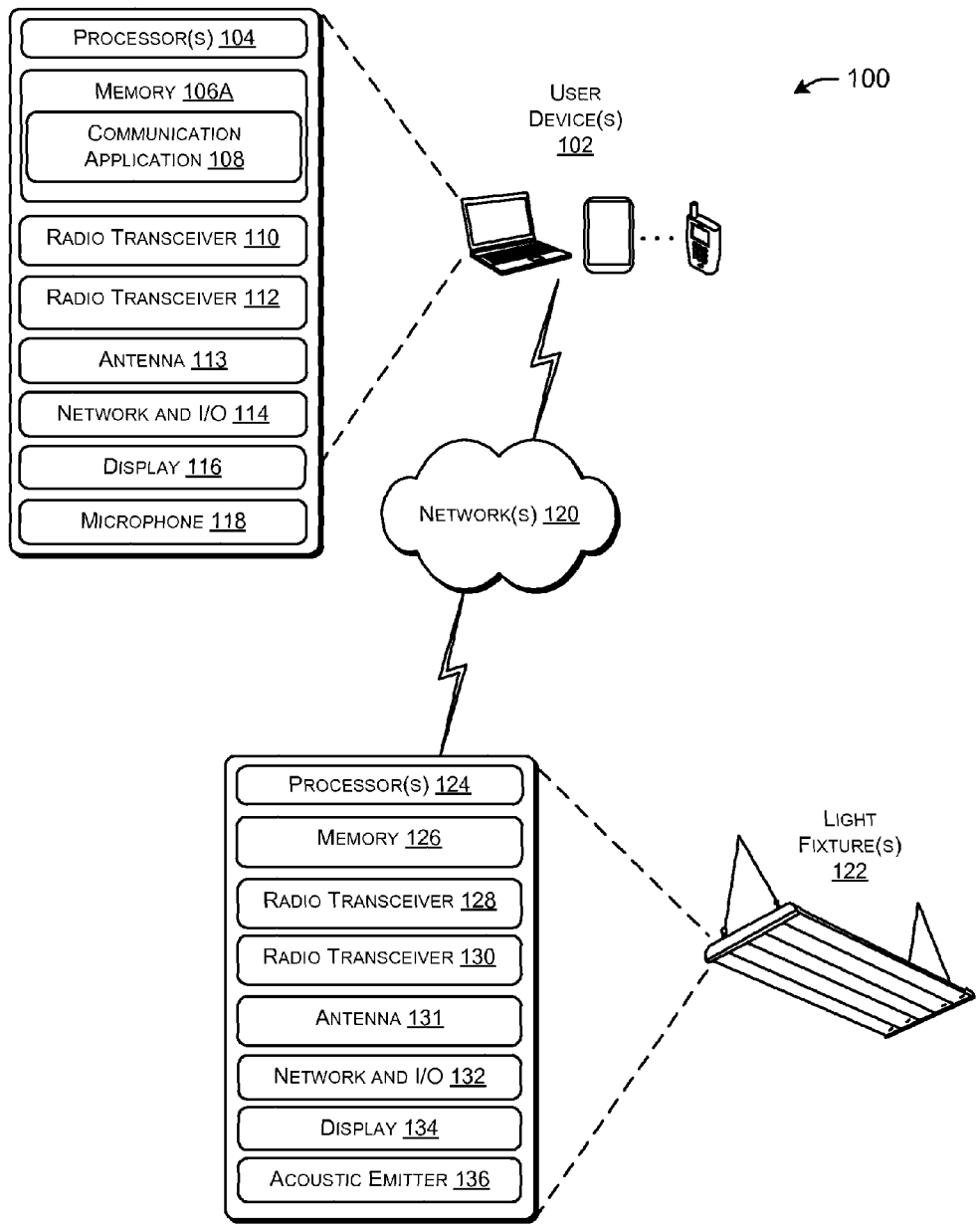
FIG. 1 shows a block diagram of a system for device provisioning, according to one or more example embodiments.

In the following description, numerous specific details are set forth. However, it should be understood that embodiments of the present disclosure may be practiced without these specific details. In other instances, well-known methods, structures, and techniques have not been shown in detail in order not to obscure an understanding of this description. References to "one embodiment," "an embodiment," "example embodiment," "various embodiments," and so forth indicate that the embodiment(s) of the present disclosure so described may include a particular feature, structure, or characteristic, but not every embodiment necessarily includes the particular feature, structure, or characteristic. Furthermore, repeated use of the phrase "in one embodiment" does not necessarily refer to the same embodiment, although it may.

As used herein, unless otherwise specified, the use of the ordinal adjectives "first," "second," "third," etc., to describe a common object merely indicates that different instances of like objects are being referred to and are not intended to imply that the objects so described must be in a given sequence, either temporally, spatially, in ranking, or in any other manner.

As used herein, unless otherwise specified, the term "mobile device" refers, in general, to a wireless communication device, and more particularly to one or more of the following: a portable electronic device, a telephone (e.g., cellular phone, smart phone), a computer (e.g., laptop computer, tablet computer), a portable media player, a personal digital assistant (PDA), or any other electronic device having a networked capability.

As used herein, unless otherwise specified, the term "server" may refer to any computing device having a networked connectivity and configured to provide one or more dedicated services to clients, such as a mobile device. The services may include storage of data or any kind of data processing. One example of the server may include a web server hosting one or more web pages. Some examples of web pages may include social networking web pages. Another example of a server may be a cloud server that hosts web services for one or more computer devices.

As used herein, unless otherwise specified, the term "light fixture" may refer to any object associated with illumination of a room, such as a light switch, a light bulb, circuitry connecting a light switch with a light bulb, and/or the like. Furthermore, the term light fixture may also refer to any wireless devices included in and/or otherwise coupled to the light fixture.

As used herein, unless otherwise specified, the term "receiver" may refer to any device or component capable of receiving data, signals, information, etc. For example, a receiver may include an antenna or any other receiving device.

As used herein, unless otherwise specified, the term "transmitter" may refer to any device or component capable of transmitting data, signals, information, etc. For example, a transmitter may also include an antenna or any other transmission device.

According to certain embodiments, the functionality provided by the receiver and the transmitter may be included in a single transceiver device.

The present disclosure relates to computer-implemented systems and methods for device provisioning. According to one or more embodiments of the disclosure, a method is provided. The method may include receiving, by a computer, a selection instruction to detect wireless devices. The computer may include one or more processors, a radio transceiver, and a microphone. The method may also include identifying, by the radio transceiver, a plurality of wireless devices. Additionally, the method may include transmitting, by the radio transceiver to the wireless devices, respective requests for inaudible audio signal transmission. The method may also include receiving, by the microphone, a first inaudible audio signal from a first wireless device of the plurality of wireless devices. Further still, the method may include determining, based at least in part on the first inaudible audio signal, that the first wireless device is located in the same room as the user device.

According to one or more embodiments of the disclosure, a device is provided. The device may include a radio transceiver and a microphone. The device may also include at least one memory for storing data and computer-executable instructions. Additionally, the device may also include at least one processor to access the at least one memory and to execute the computer-executable instructions. Furthermore, the at least one processor may be configured to execute the instructions to receive instructions to detect wireless devices. Additionally, the at least one processor may be configured to execute the instructions to identify, by the radio transceiver, a plurality of wireless devices. The at least one processor may also be configured to execute the instructions to transmit, by the radio transceiver to the wireless devices, respective requests for inaudible audio signal transmission and receive, by the microphone, a first inaudible audio signal from a first wireless device of the plurality of wireless devices. Furthermore, the at least one processor may also be configured to execute the instructions to determine, based at least in part on the first inaudible audio signal, that the first wireless device is located in the same room as the user device.

According to one or more embodiments of the disclosure, a non-transitory computer-readable medium is provided. The non-transitory computer-readable medium may have embodied thereon instructions executable by one or more processors. The instructions may cause the one or more processors to perform a method. The method may include receiving, by a computer, a selection instructions to detect wireless devices. The computer may include one or more processors, a radio transceiver, and a microphone. The method may also include identifying, by the radio transceiver, a plurality of wireless devices. Additionally, the method may include transmitting, by the radio transceiver to the wireless devices, respective requests for inaudible audio signal transmission. The method may also include receiving, by the microphone, a first inaudible audio signal from a first wireless device of the plurality of wireless devices. Further still, the method may include determining, based at least in part on the first inaudible audio signal, that the first wireless device is located in the same room as the user device.

The above principles, as well as perhaps others, are now illustrated with reference to FIG. 1, which depicts a system 100 for device provisioning. The system 100 may include a first user device 102 having one or more computer processors 104, a memory 106, which may store a communication application 108, a first radio transceiver 110, a second radio transceiver 112, an antenna 113, network and input/output (I/O) interfaces 114, a display 116, and a microphone 118, all in communication with each other. The system 100 may also include a light fixture 122 having one or more computer processors 124, a memory 126, a first radio transceiver 128, a second radio transceiver 130, an antenna 131, a network and input/output (I/O) interfaces 132, a display 134, and an acoustic emitter 136 in communication with each other. In general, as will be described below, the second radio transceiver 112 of the user device 102 may communicate with the second radio transceiver 130 of the light fixture(s) 122 to detect whether the light fixture(s) 122 is/are in the same room as the user device. If a light fixture 122 is determined to be in the same room as the user device 102, the first radio transceiver 110 of the user device 102 may communicate with the first radio transceiver 128 of the light fixture 122 to facilitate device provisioning. Furthermore, it will be appreciated that all radio transceivers described with respect to the user device 102 and light fixture(s) 122 may be configured to receive and/or transmit any type of radio signals (e.g., Wi-Fi radio signals, Bluetooth radio signals, Bluetooth Low-Energy radio signals, etc.).

The computer processors 104, 124 may comprise one or more cores and may be configured to access and execute (at least in part) computer-readable instructions stored in the respective memories 106, 126. The one or more computer processors 104, 124 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user devices 102 may also include a chipset (not shown) for controlling communications between the one or more processors 104 and one or more of the other components of the user device 102. In certain embodiments, the user device 102 may be based on an Intel® architecture or an ARM® architecture, and the processor(s) and chipset may be from a family of Intel® processors and chipsets. The one or more processors 104 may also include one or more application-specific integrated circuits (ASICs) or application-specific standard products (ASSPs) for handling specific data processing functions or tasks.

The memories 106, 126 may comprise one or more computer-readable storage media (CRSM). In some embodiments, the memory 106, 126 may include non-transitory media such as random access memory (RAM), flash RAM, magnetic media, optical media, solid-state media, and so forth. The memory 106 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memories 106, 126 may store an operating system that includes a plurality of computer-executable instructions that may be implemented by the computer processor 104, 124 to perform a variety of tasks to operate the interface(s) and any other hardware installed on the user device 102. The memories 106, 126 may also store content that may be displayed by the user device 102 or transferred to other devices (e.g., headphones) to be displayed or played by the other devices. The memories 106, 126 may also store content received from the other devices. The content from the other devices may be displayed, played, or used by the user device 102 to perform any necessary tasks or operations that may be implemented by the computer processor 104, 124 or other components in the user device 102 or light fixture 122.

The network and I/O interfaces 114, 132 may also comprise one or more communication interfaces or network interface devices to provide for the transfer of data between the user device 102 and another device (e.g., network server) via a network (not shown). The communication interfaces may include, but are not limited to: personal area networks (PANs), wired local area networks (LANs), wireless local area networks (WLANs), wireless wide area networks (WWANs), and so forth. The user device 102 may be coupled to the network via a wired connection. However, the wireless system interfaces may include the hardware and software to broadcast and receive messages either using the Wi-Fi Direct Standard (see Wi-Fi Direct specification published in October 2010) and/or the IEEE 802.11 wireless standard (see IEEE 802.11-2012, published Mar. 29, 2012), the Bluetooth standard, or any other wireless standard and/or a combination thereof. The wireless system (not shown) may include a transmitter and a receiver or a transceiver capable of operating in a broad range of operating frequencies governed by the IEEE 802.11 wireless standards. The communication interfaces may utilize acoustic, radio frequency, optical, or other signals to exchange data between the user device 102 and another device such as an access point, a host computer, a server, a router, a reader device, and the like. The network 120 may include, but is not limited to: the Internet, a private network, a virtual private network, a wireless wide area network, a local area network, a metropolitan area network, a telephone network, and so forth.

The displays 116, 134 may include, but are not limited to, a liquid crystal display, a light-emitting diode display, or an E-Ink™ display as made by E Ink Corp. of Cambridge, Mass. The displays may be used to show content to a user in the form of text, images, or video. In certain instances, the displays may also operate as a touch screen display that may enable the user to initiate commands or operations by touching the screen using certain finger or hand gestures.

Broadly, a user of the user device 102 may wish to automatically affect a particular outcome upon entering a room and/or upon activating the user device 102 while in the room. For instance, the user may wish for the lights in the room to be switched on. As another example, the user may wish the user device 102 to be provisioned with device provisioning information, such as provisioning information that would enable the user device 102 to connect to a wireless network. Furthermore, a light fixture 122 may be located in the same room as the user device 102 and may be configured to communicate with the user device 102 to facilitate a particular outcome associated with the room and/or the user device 102.

For example, the light fixtures 122 may be configured to periodically advertise and/or broadcast their presence to other wireless devices, such as the user device 102. In certain cases, the user device 102 may receive an indication from the user (not pictured) to search and/or otherwise detect the presence of wireless devices. For example, a user may press a button, interact with a user interface on the display 116, and/or otherwise indicate to the user device 102/communication application 108 to initiate detection of wireless devices. In response, the communication application 108 of the user device 102 may be configured to detect one or more light fixtures 122 via the second radio transceiver 112. In certain embodiments, the second radio transceiver 112 may be a Bluetooth Low-Energy transceiver.

According to one or more embodiments, the user device 102 may detect (e.g., via the second radio transceiver's 112 detection of broadcast signals by respective second radio transceivers 130 on the light fixture(s) 122) the presence of one or more light fixtures 122. Furthermore, the communication application 108 may be configured to determine respective received signal strength indications (RSSIs) associated with the one or more light fixtures 122. To this end, the communication application 108 may identify light fixtures associated with RSSIs above a predetermined RSSI threshold, which may provide an estimation of which light fixtures 122 (e.g., the light fixtures so identified) may possibly be in the same room as the user device 102.

In certain implementations, the communication application 108 may be configured to transmit requests for inaudible audio signal transmissions to the identified light fixture(s) 122. In response, the communication application 108 may receive an inaudible audio signal at microphone 118 from an acoustic emitter 136 of a particular light fixture 122, which may indicate that the particular light fixture 122 may be in the same room as the user device 102. For instance, the inaudible audio signal may be an ultrasound signal. To this end, it will be appreciated that an ultrasound signal may in general, be unable to penetrate walls. Thus, the communication application 108 may determine that if an inaudible audio signal is received, the device that emitted the inaudible audio signal is located in the same room as the user device 102. However, in certain situations, multiple inaudible audio signals may be received from multiple sources. An example of such a situation is described in more detail below with reference to FIG. 2.

In some implementations, the communication application 108 of the user device 102 may be further configured to determine signal-to-noise ratio information associated with the inaudible audio signals transmitted by the particular light fixture. In order to confirm that the particular light fixture 122 is located in the same room as the user device 102, the communication application 108 may determine whether the signal-to-noise ratio information is greater than or equal to a predetermined ratio. Furthermore, in certain implementations, the inaudible audio signal may include and/or may otherwise be associated with a wireless address identifier associated with the particular light fixture 122. As such, the communication application 108 may be configured to determine, based at least in part on the inaudible audio signal, the corresponding wireless identifier associated with the particular light fixture 122. To this end, communication application 108 may be configured to establish, based at least in part on the wireless address identifier, a connection with the light fixture 122.

As a result of establishing a connection with the light fixture 122, further actions may be facilitated. For instance, the communication application 108 may transmit, to the light fixture 122, instructions to switch on one or more lights in the room. In this manner, a user in possession of the user device 102 may cause lights in a room to be automatically switched on upon entering the room. In other implementations, upon establishing a connection with the light fixture 122, the light fixture 122 may be configured to provide device provisioning information to the user device 102. For instance, device provisioning information may include network information that may enable the user device 102 to connect to a network (e.g., wireless identifiers, credentials, passwords, and/or the like). Furthermore, the device provisioning information may include instructions for the user device 102 to download, install, and/or otherwise procure one or more applications. It will be appreciated that the device provisioning information may include information and/or instructions to affect any number of outcomes with respect to the user device 102 and/or the light fixture 122.

It will be appreciated that while FIG. 1 illustrates various components as being included within the light fixture(s) 122, any of the components may also be included as a peripheral device in communication with the light fixture(s) 122. For example, the first radio transceiver 128 and/or the second radio transceiver 130 may be included in one or more peripheral devices in communication with the light fixture(s) 122. In addition, greater and/or fewer components included in the user devices 102 and light fixture(s) 122 are also contemplated. For example, the light fixtures may not included any processing capabilities (e.g., the light fixture(s) 122 may not included processor(s) 124) and may simply be configured as slave devices to the user device 102.

Furthermore, it will be appreciated that though references have been made to the user device 102 detecting a plurality of light fixtures, the systems and methods described herein may also apply to a single light fixture 122 as well. For example, the user device 102 may be configured to establish a connection with a single display device 116 and determine, via the communication of inaudible audio signals as described above, a wireless address identifier associated with the single display device. Additionally it will be appreciated that the operations of the first radio transceiver 110 and the second radio transceiver 112 of the user device 102 may be combined into a single radio transceiver. Similarly, the operations of the first radio transceiver 128 and the second radio transceiver 130 of the light fixture(s) 122 may also be combined into a single radio transceiver.

Figure 2:
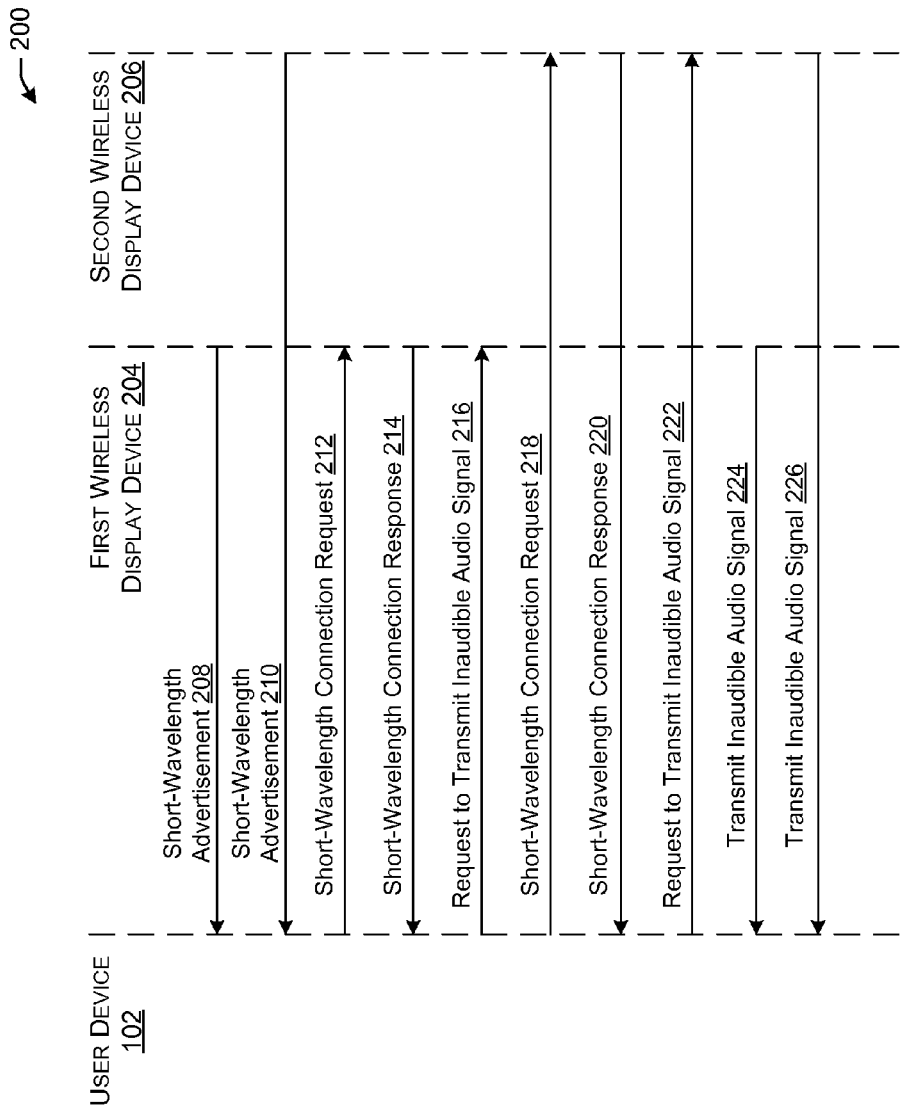
FIG. 2 shows a data flow diagram for device provisioning, according to one or more example embodiments.

FIG. 2 provides a diagram illustrating a data flow 200 between a user device 102, a first light fixture (wireless display device) 204, and a second light fixture (wireless display device) 206 in accordance with one or more example embodiments. The data flow 200 may describe a process by which the user device 102 may be employed to discover a light fixture in the same room as the user device 102 when multiple inaudible audio signals are received. For purposes of illustration only, the data flow 200 may operate under the assumption that the first light fixture 204 resides in the same room as the user device 102 while the second light fixture 206 resides in a different from the user device 102.

In accordance with one or more embodiments of the data flow 200, the first light fixture 204 and the second light fixture 206 may be configured to periodically transmit/broadcast short-wavelength advertisements 208/210. For example, the short-wavelength advertisements 208/210 may be Bluetooth radio signals, Bluetooth Low-Energy radio signals, and/or the like. For example, the user device 102 may be configured to receive the short-wavelength advertisements 208/210 upon an indication from a user to initiate detection of light fixtures.

Upon receipt of the short-wavelength advertisement 208 from the first light fixture 204, the user device 102 may be configured to transmit a short-wavelength connection request 212 to the first light fixture 204. The first light fixture 204 may then be configured to transmit a short-wavelength connection response 214 back to the user device 102. In certain embodiments, the connection response 214 may include a first wireless address identifier and a first inaudible audio signal identifier associated with the first light fixture 204. The first wireless address identifier and the first inaudible audio signal identifier may further be linked and/or otherwise associated with each other. In addition, the connection response 214 may also include an acknowledgement of the connection request 212. The user device 102 may then request that the first light fixture 204 transmit a first inaudible audio signal 216. In response, the first light fixture 204 may transmit the first inaudible audio signal 224 to the user device 102 (e.g., which may be received by the microphone 118 of the user device 102).

Similar communication may also be performed between the user device 102 and the second light fixture 206. For example, upon receipt of the short-wavelength advertisement 210 from the second light fixture 206, the user device 102 may be configured to transmit a short-wavelength connection request 218 to the second light fixture 206. The second light fixture 206 may then be configured to transmit a short-wavelength connection response 220 back to the user device 102. In certain embodiments, the connection response 220 may include a second wireless address identifier and a second inaudible audio signal identifier associated with the second light fixture 206. The second wireless address identifier and the second inaudible audio signal identifier may further be linked and/or otherwise associated with each other. In addition, the connection response 220 may also include an acknowledgement of the connection request 218. The user device 102 may then request that the second light fixture 206 transmit a second inaudible audio signal 222. In response, the second light fixture 206 may transmit the second inaudible audio signal 226 to the user device 102 (e.g., which may be received by the microphone 118 of the user device 102).

It will be appreciated that the data flow 200 illustrated in FIG. 2 is not limited to any particular sequence and that communication between the user device 102, the first light fixture 204, and the second light fixture 206 may be interleaved in any combination. For example, in some implementations, the transmissions of the inaudible audio signals 224/226 may occur approximately simultaneously in order to reduce the recording time of the microphone 118 on the user device 102. Alternatively, the transmission of the inaudible audio signal 224 from the first light fixture 204 may immediately follow the first light fixture's 204 receipt of the transmission request 216. Similarly, the transmission of the inaudible audio signal 226 may immediately follow the second light fixture's 206 receipt of the transmission request 222.

Furthermore, it will be appreciated that while FIG. 2 has been described with references to short-wavelength radio signals (e.g., short-wavelength advertisements 208/210, short-wavelength connection requests 212/218, and short-wavelength responses 214/220), such references are for exemplary purposes only. Indeed, any type of radio signals is also contemplated and may be transmitted and/or received as advertisements, connection requests, and/or connection responses.

Figure 3:
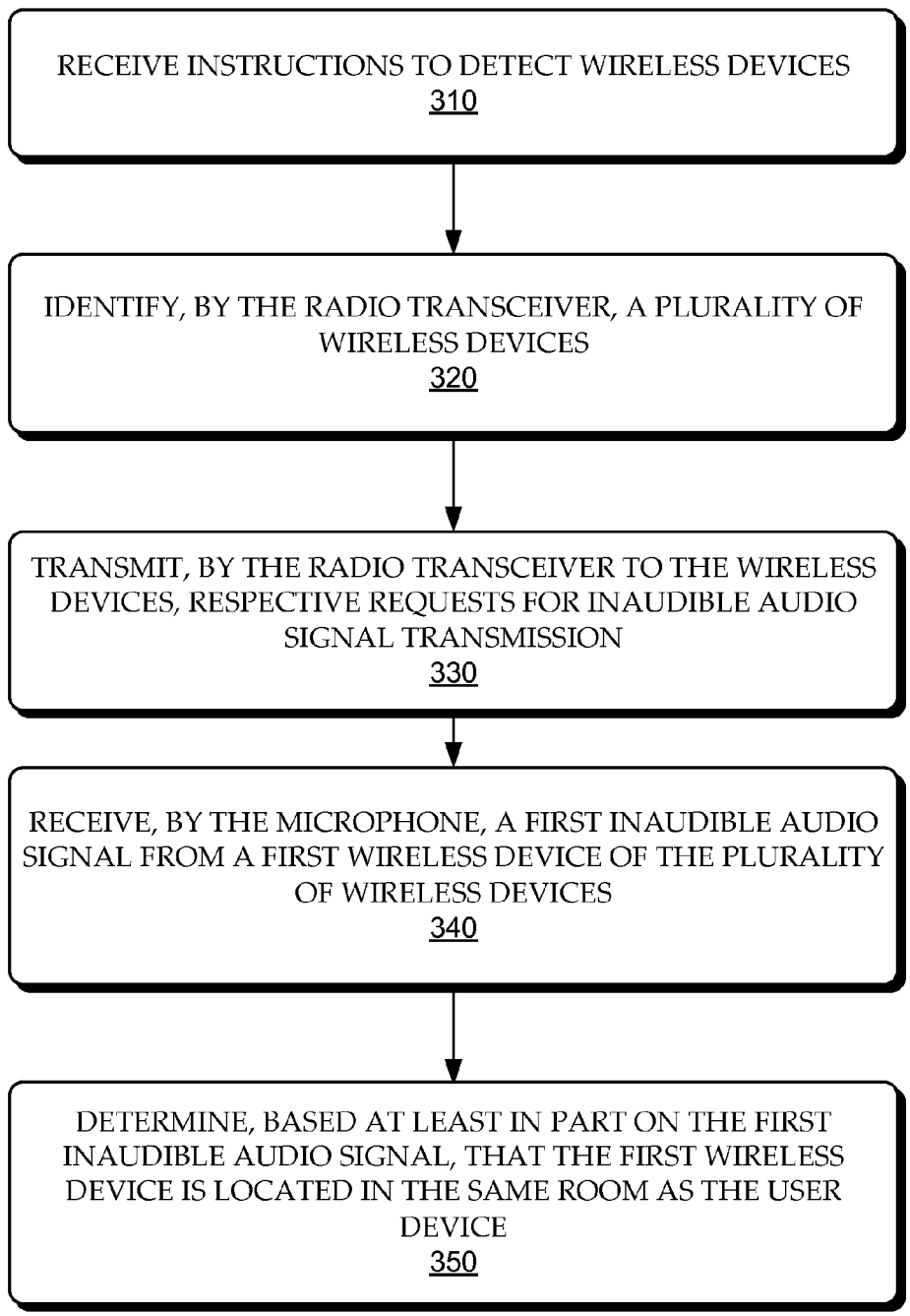
FIG. 3 shows a flow diagram for device provisioning, according to one or more example embodiments.

Referring now to FIG. 3, a flow diagram of a method 300 is illustrated for device provisioning in accordance with one or more example embodiments. The method 300 may provide a general operation of identifying a light fixture in the same room as a user device. As such, the method 300 may begin in block 310, where a user device (e.g., user device 102) may receive instructions to detect wireless devices. In block 320, the user device 102 may identify, by the radio transceiver, a plurality of wireless devices. In certain implementations, the plurality of wireless devices may be identified using short-wavelength radio signals, such as Bluetooth signals and/or Bluetooth Low-Energy signals. In block 330, the user device 102 may transmit, by the radio transceiver to the wireless devices, respective requests for inaudible audio signal transmission. In block 340, the user device 102 may be configured to receive, by the microphone, a first inaudible audio signal from a first wireless device of the plurality of wireless devices. As a result, the user device 102 may be configured to determine, based at least in part on the first inaudible audio signal, that the first wireless device is located in the same room as the user device.

Certain embodiments of the present disclosure are described above with reference to block and flow diagrams of systems and methods and/or computer program products according to example embodiments of the present disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the present disclosure.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the present disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the present disclosure have been described in connection with what is presently considered to be the most practical and various embodiments, it is to be understood that the present disclosure is not to be limited to the disclosed embodiments, but is intended to cover various modifications and equivalent arrangements included within the scope of the appended claims. Although specific terms are employed herein, they are used in a generic and descriptive sense only and not for purposes of limitation.

This written description uses examples to disclose certain embodiments of the present disclosure, including the best mode, and also to enable any person skilled in the art to practice certain embodiments of the present disclosure, including making and using any devices or systems and performing any incorporated methods. The patentable scope of certain embodiments of the present disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Example 1 is a method, including identifying, by a user device comprising one or more processors, a radio transceiver, and a microphone, a plurality of wireless devices; transmitting, by the radio transceiver to the plurality of wireless devices, respective requests for inaudible audio signal transmission; receiving, by the microphone, a first inaudible audio signal from a first wireless device of the plurality of wireless devices; and determining, based at least in part on the first inaudible audio signal, that the first wireless device is located in a same room as the user device.

In Example 2, the subject matter of Example 1 can optionally include that the first wireless device is coupled to a light fixture in the room.

In Example 3, the subject matter of Example 2 can optionally include transmitting, to the light fixture, instructions to switch on one or more lights in the room.

In Example 4, the subject matter of Example 1 can optionally include receiving, from the first wireless device, device provisioning information for the user device; and connecting, based at least in part on the device provisioning information, the user device with a network.

In Example 5, the subject matter of Example 1 can optionally include that determining that the user device is located in the same room as the first wireless device further comprises: determining that a signal-to-noise ratio associated with the first inaudible audio signal is greater than or equal to a predetermined ratio.

In Example 6, the subject matter of Example 1 can optionally include receiving instructions to detect the wireless devices in response to activating the user device.

In Example 7, the subject matter of Example 1 can optionally include that the radio transceiver is a Bluetooth Low-Energy transceiver.

In Example 8, the subject matter of Example 1 can optionally include that the first inaudible audio signal comprises an ultrasound signal associated with a frequency range of approximately 20 gigahertz to approximately 300 gigahertz.

Example 9 is a light fixture, including: a radio transceiver; a microphone; at least one processor; and at least one memory storing computer-executable instructions, that when executed by the at least one processor, causes the at least one processor to: identify, by the radio transceiver, a plurality of wireless devices; transmit, by the radio transceiver to the wireless devices, respective requests for inaudible audio signal transmission; receive, by the microphone, a first inaudible audio signal from a first wireless device of the plurality of wireless devices; and determine, based at least in part on the first inaudible audio signal, that the first wireless device is located in the same room as the user device.

In Example 10, the subject matter of Example 9 can optionally include that the first wireless device is coupled to a light fixture in the room.

In Example 11, the subject matter of Example 10 can optionally include that the computer-executable instructions further cause the at least on processor to: transmit, to the light fixture, instructions to switch on one or more lights in the room.

In Example 12, the subject matter of Example 9 can optionally include that the computer-executable instructions further cause the at least on processor to: receive, from the first wireless device, device provisioning information for the user device; and connect, based at least in part on the device provisioning information, the user device with a network.

In Example 13, the subject matter of Example 6 can optionally include that the computer-executable instructions to determine that the user device is located in the same room as the first wireless device further cause the at least one processor to: determine that a signal-to-noise ratio associated with the first inaudible audio signal is greater than or equal to a predetermined ratio.

In Example 15, the subject matter of Example 9 can optionally include that the radio transceiver is a Bluetooth Low-Energy transceiver.

In Example 16, the subject matter of Example 9 can optionally include that the first inaudible audio signal comprises an ultrasound signal associated with a frequency range of approximately 20 gigahertz to approximately 300 gigahertz.

Example 17 is a non-transitory computer-readable medium comprising instructions, that when executed by at least one processor, cause the at least one processor to perform a method comprising: identifying, by a computer, a plurality of wireless devices, the computer comprising one or more processors, a radio transceiver, and a microphone; transmitting, by the radio transceiver to the wireless devices, respective requests for inaudible audio signal transmission;

receiving, by the microphone, a first inaudible audio signal from a first wireless device of the plurality of wireless devices; and determining, based at least in part on the first inaudible audio signal, that the first wireless device is located in the same room as the user device.

In Example 18, the subject matter of Example 17 can optionally include that the first wireless device is coupled to a light fixture in the room.

In Example 19, the subject matter of Example 18 can optionally include that the method further comprises: transmitting, to the light fixture, instructions to switch on one or more lights in the room.

In Example 20, the subject matter of Example 17 can optionally include that the method further comprises: receiving, from the first wireless device, device provisioning information for the user device; and connecting, based at least in part on the device provisioning information, the user device with a network.

In Example 21, the subject matter of Example 17 can optionally include that determining that the user device is located in the same room as the first wireless device further comprises: determining that a signal-to-noise ratio associated with the first inaudible audio signal is greater than or equal to a predetermined ratio.

In Example 22, the subject matter of Example 17 can optionally include that the method further comprises receiving instructions to detect the wireless devices in response to activating the user device.

In Example 23, the subject matter of Example 17 can optionally include that the radio transceiver is a Bluetooth Low-Energy transceiver.

In Example 24, the subject matter of Example 17 can optionally include that the first inaudible audio signal comprises an ultrasound signal associated with a frequency range of approximately 20 gigahertz to approximately 300 gigahertz.

Example 25, apparatus, including: means for identifying a plurality of wireless devices; means for transmitting, to the plurality of wireless devices, respective requests for inaudible audio signal transmission; means for receiving a first inaudible audio signal from a first wireless device of the plurality of wireless devices; and means for determining, based at least in part on the first inaudible audio signal, that the first wireless device is located in a same room as the user device.

In Example 26, the subject matter of Example 25 can optionally include that he first wireless device is coupled to a light fixture in the room.

In Example 27, the subject matter of Example 26 can optionally include means for transmitting, to the light fixture, instructions to switch on one or more lights in the room.

In Example 28, the subject matter of Example 25 can optionally include means for receiving, from the first wireless device, device provisioning information for the user device; and means for connecting, based at least in part on the device provisioning information, the user device with a network.

In Example 29, the subject matter of Example 25 can optionally include that the means for determining that the user device is located in the same room as the first wireless device further comprises: means for determining that a signal-to-noise ratio associated with the first inaudible audio signal is greater than or equal to a predetermined ratio.

In Example 30, the subject matter of Example 25 can optionally include means for receiving instructions to detect the plurality of wireless devices in response to activating the user device.

In Example 31, the subject matter of Example 25 can optionally include that the radio transceiver is a Bluetooth Low-Energy transceiver.

In Example 32, the subject matter of Example 30 can optionally include that the first inaudible audio signal comprises an ultrasound signal associated with a frequency range of approximately 20 gigahertz to approximately 300 gigahertz.

What is claimed is:

1. A method, comprising:
   identifying, by a user device, one or more signals from a light fixture, wherein the user device comprises one or more processors, a radio transceiver, and a microphone, and wherein a first signal of the one or more signals indicates an invitation to connect with the light fixture;
   transmitting, by the radio transceiver to the light fixture, a request for a second signal, wherein the second signal comprises an inaudible audio signal;
   receiving, by the microphone, a first inaudible audio signal from the light fixture;
   determining, based on the first inaudible audio signal, that the light fixture is located in a same room as the user device; and
   transmitting, by the radio transceiver, a third signal to the light fixture based on the determination that the light fixture is located in the same room as the user device.

2. The method of claim 1, further comprising:
   transmitting, to the light fixture, instructions to switch on one or more lights in the same room.

3. The method of claim 1, further comprising:
   receiving, from the light fixture, device provisioning information for the user device; and
   connecting, based at least in part on the device provisioning information, the user device with a network.

4. The method of claim 1, wherein determining that the user device is located in the same room as the light fixture further comprises:
   determining that a signal-to-noise ratio associated with the first inaudible audio signal is greater than or equal to a predetermined ratio.

5. The method of claim 1, further comprising:
   receiving instructions to detect the light fixture in response to activating the user device.

6. The method of claim 1, wherein the radio transceiver is a Bluetooth Low-Energy transceiver.

7. The method of claim 1, wherein the first inaudible audio signal comprises an ultrasound signal.

8. The method of claim 1, wherein the light fixture is coupled to at least one transceiver, wherein the at least one transceiver is configured to send the first signal and the second signal, and wherein the at least one transceiver is further configured to receive the request.

9. An apparatus, comprising:
   a radio transceiver;
   a microphone;
   at least one processor; and
   at least one memory storing computer-executable instructions, that when executed by the at least one processor, causes the at least one processor to:
   cause the radio transceiver to identify, one or more first signals from a light fixture, wherein a first signal of the one or more first signals indicates an invitation to connect with the light fixture;
   cause the radio transceiver to transmit, to the light fixture, a request for a second signal, wherein the second signal comprises an inaudible audio signal;

cause the microphone to receive a first inaudible audio signal from the light fixture;

determine, based on the first inaudible audio signal, that the light fixture is located in a same room as the apparatus; and cause the radio transceiver to transmit a third signal to the light fixture based on the determination that the light fixture is located in the same room as the apparatus.

10. The apparatus of claim 9, wherein the computer-executable instructions further cause the at least one processor to:

cause the radio transceiver to transmit, to the light fixture, instructions to switch on one or more lights in the same room.

11. The apparatus of claim 9, wherein the computer-executable instructions further cause the at least one processor to:

cause the radio transceiver to identify, from the light fixture, device provisioning information for the apparatus; and cause the radio transceiver to connect, based at least in part on the device provisioning information, the apparatus with a network.

12. The apparatus of claim 9, wherein the computer-executable instructions to determine that the apparatus is located in the same room as the light fixture further cause the at least one processor to:

determine that a signal-to-noise ratio associated with the first inaudible audio signal is greater than or equal to a predetermined ratio.

13. The apparatus of claim 9, wherein the computer-executable instructions further cause the at least one processor to:

receive instructions to detect the light fixture in response to activating the apparatus.

14. The apparatus of claim 9, wherein the radio transceiver is a Bluetooth Low-Energy transceiver.

15. The apparatus of claim 9, wherein the first inaudible audio signal comprises an ultrasound signal.

16. The apparatus of claim 9, wherein the light fixture is coupled to at least one transceiver, wherein the at least one transceiver is configured to send the first signal and the second signal, and wherein the at least one transceiver is further configured to receive the request.

17. A non-transitory computer-readable medium comprising instructions, that when executed by at least one processor, cause the at least one processor to perform a method comprising:

causing a radio transceiver of a user device to identify one or more signals from a light fixture, the user device comprising one or more processors, a radio transceiver, and a microphone, wherein a first signal of the one or more signals indicates an invitation to connect with the light fixture;

causing the radio transceiver to send, to the light fixture, a request for a second signal, wherein the second signal comprises an inaudible audio signal transmission;

receiving, by the microphone, a first inaudible audio signal from the light fixture;

determining, based on the first inaudible audio signal, that the light fixture is located in a same room as the user device; and causing the radio transceiver to send a third signal to the light fixture based on the determination that the light fixture is located in the same room as the user device.

18. The computer-readable medium of claim 17, wherein the method further comprises:

causing the radio transceiver to transmit, to the light fixture, instructions to switch on one or more lights in the same room.

19. The computer-readable medium of claim 17, wherein the method further comprises:

causing the radio transceiver to identify, from the light fixture, device provisioning information for the user device; and causing the radio transceiver to connect, based at least in part on the device provisioning information, the user device with a network.

20. The computer-readable medium of claim 17, wherein determining that the user device is located in the same room as the light fixture further comprises:

determining that a signal-to-noise ratio associated with the first inaudible audio signal is greater than or equal to a predetermined ratio.

21. The computer-readable medium of claim 17, wherein the method further comprises:

causing the radio transceiver to receive instructions to detect the light fixture in response to activating the user device.

22. The computer-readable medium of claim 17, wherein the radio transceiver is a Bluetooth Low-Energy transceiver.

23. The computer-readable medium of claim 17, wherein the first inaudible audio signal comprises an ultrasound signal.

24. The non-transitory computer-readable medium of claim 17, wherein the light fixture is coupled to at least one transceiver, wherein the at least one transceiver is configured to send the first signal and the second signal, and wherein the at least one transceiver is further configured to receive the request.

* * * * *